(12) United States Patent
Ishida et al.

(10) Patent No.: US 7,933,910 B2
(45) Date of Patent: Apr. 26, 2011

(54) RETRIEVING APPARATUS, RETRIEVING METHOD, AND RETRIEVING PROGRAM OF HIERARCHICAL STRUCTURE DATA

(75) Inventors: Tomotoshi Ishida, Hitachinaka (JP); Mutsuo Kantou, Yokohama (JP); Miyako Hotta, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 892 days.

(21) Appl. No.: 11/543,022

(22) Filed: Oct. 5, 2006

(65) Prior Publication Data

US 2007/0083532 A1   Apr. 12, 2007

(30) Foreign Application Priority Data

Oct. 7, 2005 (JP) ................................. 2005-294293

(51) Int. Cl.
*G06F 17/30* (2006.01)
(52) U.S. Cl. ......... 707/758; 707/778; 707/829; 707/956
(58) Field of Classification Search .............. 707/3, 10, 707/102, 758, 778, 829, 956, 999.001, 999.003, 707/999.102
See application file for complete search history.

(56) References Cited

U.S. PATENT DOCUMENTS

| | | | | |
|---|---|---|---|---|
| 5,692,184 A * | 11/1997 | Ardoin et al. | ................... | 707/758 |
| 5,918,210 A * | 6/1999 | Rosenthal et al. | ...... | 707/999.202 |
| 5,991,756 A * | 11/1999 | Wu | ................. | 707/758 |
| 5,999,924 A * | 12/1999 | Bair et al. | ............................ | 707/3 |
| 6,061,692 A * | 5/2000 | Thomas et al. | ................ | 707/956 |
| 6,434,564 B2 * | 8/2002 | Ebert | ............................ | 707/956 |
| 6,442,543 B1 * | 8/2002 | Snodgrass et al. | ...... | 707/999.002 |
| 6,547,661 B1 * | 4/2003 | Ferrandez | ...................... | 460/144 |
| 6,618,727 B1 * | 9/2003 | Wheeler et al. | ................ | 707/779 |
| 6,647,380 B1 * | 11/2003 | Yotsukura | .......................... | 707/3 |
| 6,678,692 B1 * | 1/2004 | Hyatt | .............................. | 707/758 |
| 6,754,648 B1 * | 6/2004 | Fittges et al. | ................. | 707/758 |
| 7,162,480 B2 * | 1/2007 | Vishik | ............................ | 707/778 |
| 7,325,017 B2 * | 1/2008 | Tormasov et al. | ............. | 707/822 |
| 2001/0051946 A1 | 12/2001 | Nishikawa | | |
| 2002/0052666 A1 * | 5/2002 | Fukatsu et al. | ................. | 700/107 |
| 2004/0158799 A1 * | 8/2004 | Breuel | ............................ | 715/513 |
| 2004/0215632 A1 * | 10/2004 | Isip et al. | ........................ | 707/100 |
| 2005/0216421 A1 * | 9/2005 | Barry et al. | ........................ | 705/64 |
| 2006/0218135 A1 * | 9/2006 | Bisson et al. | ....................... | 707/4 |

FOREIGN PATENT DOCUMENTS

| | | |
|---|---|---|
| JP | 09-259134 | 10/1997 |
| JP | 11-066139 | 3/1999 |
| JP | 11-296586 | 10/1999 |
| JP | 2001-075629 | 3/2001 |
| JP | 2001-187477 | 7/2001 |
| JP | 2002-342352 | 11/2002 |

* cited by examiner

*Primary Examiner* — Charles Rones
*Assistant Examiner* — Rezwanul Mahmood
(74) *Attorney, Agent, or Firm* — Antonelli, Terry, Stout & Kraus, LLP.

(57) ABSTRACT

A data retrieving apparatus having: an input apparatus for inputting the hierarchical structure data showing the hierarchical structure and operation instruction data; a data storing apparatus for storing the inputted hierarchical structure data; a retrieving apparatus for retrieving data which satisfies conditions from the hierarchical structure data stored in the data storing apparatus on the basis of the operation instruction data which is inputted by the input apparatus; and an output apparatus for outputting the retrieved data. Each data which is stored in the data storing apparatus has items regarding an efficient date and items regarding a data change date. The retrieving apparatus has an apparatus for retrieving the data on the basis of the efficient date and the data change date.

6 Claims, 16 Drawing Sheets

FIG.6

| | PART NO. | PART NAME | OTHERS | DATA CREATION DATE | DATA DELETION DATE | EFFICIENT START DATE | EFFICIENT COMPLETION DATE |
|---|---|---|---|---|---|---|---|
| | | | | *(FUNDAMENTAL)* / *(CHANGE HISTORY)* | | *(EFFICIENT TERM)* | |
| 61 | A | ... | ... | 01/10 | * | 02/01 | * |
| 62 | B | ... | ... | 01/10 | * | 02/01 | * |
| 63 | C | ... | ... | 01/10 | * | 02/01 | * |
| 64 | D | ... | P | 01/10 | * | 02/01 | * |
| 65 | E | ... | ... | 01/10 | * | 02/01 | * |

FIG.7

| | PARENT PART NO. | CHILD PART NO. | THE NUMBER OF PERSONS | OTHERS | DATA CREATION DATE | DATA DELETION DATE | EFFICIENT START DATE | EFFICIENT COMPLETION DATE |
|---|---|---|---|---|---|---|---|---|
| 71 | A | B | 1 | | 01/10 | * | 02/01 | * |
| 72 | A | C | 1 | | 01/10 | * | 02/01 | * |
| 73 | B | D | 1 | | 01/10 | * | 02/01 | * |
| 74 | B | E | 1 | | 01/10 | * | 02/01 | * |

FIG.8

| | PART NO. | PART NAME | OTHERS | DATA CREATION DATE | DATA DELETION DATE | EFFICIENT START DATE | EFFICIENT COMPLETION DATE |
|---|---|---|---|---|---|---|---|
| 61 | A | ... | ... | 01/10 | * | 02/01 | * |
| 62 | B | ... | ... | 01/10 | * | 02/01 | * |
| 63 | C | ... | ... | 01/10 | * | 02/01 | * |
| 64 | D | ... | P | 01/10 | * | 02/01 | * |
| 65 | E | ... | ... | 01/10 | * | 02/01 | * |
| 86 | F | ... | ... | 01/20 | * | 03/01 | * |

FIG.9

| | FUNDAMENTAL | | | | CHANGE HISTORY | | EFFICIENT TERM | |
|---|---|---|---|---|---|---|---|---|
| | PARENT PART NO. | CHILD PART NO. | THE NUMBER OF CHILD NUMBER | OTHERS | DATA CREATION DATE | DATA DELETION DATE | EFFICIENT START DATE | EFFICIENT COMPLETION DATE |
| 71 | A | B | 1 | | 01/10 | * | 02/01 | * |
| 72 | A | C | 1 | | 01/10 | * | 02/01 | * |
| 73 | B | D | 1 | | 01/10 | * | 02/01 | * |
| 94 | B | E | 1 | | 01/10 | 01/20 | 02/01 | * |
| 95 | B | E | 1 | | 01/20 | * | 02/01 | 03/01 |
| 96 | B | F | 1 | | 01/20 | * | 03/01 | * |

FIG.10

| | FUNDAMENTAL | | | CHANGE HISTORY | | EFFICIENT TERM | |
|---|---|---|---|---|---|---|---|
| | PART NO. | PART NAME | OTHERS | DATA CREATION DATE | DATA DELETION DATE | EFFICIENT START DATE | EFFICIENT COMPLETION DATE |
| 61 | A | ... | ... | 01/10 | * | 02/01 | * |
| 62 | B | ... | ... | 01/10 | * | 02/01 | * |
| 63 | C | ... | ... | 01/10 | * | 02/01 | * |
| 64 | D | ... | P | 01/10 | * | 02/01 | * |
| 65 | E | ... | ... | 01/10 | * | 02/01 | * |
| 86 | F | ... | ... | 01/20 | * | 03/01 | * |
| 107 | G | ... | ... | 01/30 | * | 03/01 | * |

FIG.11

| | PARENT PART NO. | CHILD PART NO. | THE NUMBER OF CHILD NUMBER | OTHERS | DATA CREATION DATE | DATA DELETION DATE | EFFICIENT START DATE | EFFICIENT COMPLETION DATE |
|---|---|---|---|---|---|---|---|---|
| | \<-- FUNDAMENTAL --\> | | | | \<-- CHANGE HISTORY --\> | | \<-- EFFICIENT TERM --\> | |
| 71 | A | B | 1 | | 01/10 | * | 02/01 | * |
| 72 | A | C | 1 | | 01/10 | * | 02/01 | * |
| 73 | B | D | 1 | | 01/10 | * | 02/01 | * |
| 94 | B | E | 1 | | 01/10 | 01/20 | 02/01 | * |
| 95 | B | E | 1 | | 01/20 | * | 02/01 | 03/01 |
| 116 | B | F | 1 | | 01/20 | 01/30 | 03/01 | * |
| 117 | B | G | 1 | | 01/30 | * | 03/01 | * |
| | | | | | | | | |

FIG.12

| | PART NO. | PART NAME | OTHERS | DATA CREATION DATE | DATA DELETION DATE | EFFICIENT START DATE | EFFICIENT COMPLETION DATE |
|---|---|---|---|---|---|---|---|
| | \<-- FUNDAMENTAL --\> | | | \<-- CHANGE HISTORY --\> | | \<-- EFFICIENT TERM --\> | |
| 61 | A | ... | ... | 01/10 | * | 02/01 | * |
| 62 | B | ... | ... | 01/10 | * | 02/01 | * |
| 63 | C | ... | ... | 01/10 | * | 02/01 | * |
| 124 | D | ... | P | 01/10 | 02/10 | 02/01 | * |
| 125 | D | ... | P | 02/10 | * | 02/01 | 03/20 |
| 126 | D | ... | Q | 02/10 | * | 03/20 | * |
| 65 | E | ... | ... | 01/10 | * | 02/01 | * |
| 86 | F | ... | ... | 01/20 | * | 03/01 | * |
| 107 | G | ... | ... | 01/30 | * | 03/01 | * |

| | FUNDAMENTAL | | | | CHANGE HISTORY | | EFFICIENT TERM | |
|---|---|---|---|---|---|---|---|---|
| | PARENT PART NO. | CHILD PART NO. | THE NUMBER OF CHILD NUMBER | OTHERS | DATA CREATION DATE | DATA DELETION DATE | EFFICIENT START DATE | EFFICIENT COMPLETION DATE |
| 71 | A | B | 1 | | 01/10 | * | 02/01 | * |
| 72 | A | C | 1 | | 01/10 | * | 02/01 | * |
| 73 | B | D | 1 | | 01/10 | * | 02/01 | * |
| 94 | B | E | 1 | | 01/10 | 01/20 | 02/01 | * |
| 95 | B | E | 1 | | 01/20 | * | 02/01 | 03/01 |
| 116 | B | F | 1 | | 01/20 | 01/30 | 03/01 | * |
| 117 | B | G | 1 | | 01/30 | * | 03/01 | * |

FIG.19

FUNDAMENTAL | CHANGE HISTORY 1222 | EFFICIENT TERM 1223

| | PARENT ORGANIZA-TION | CHILD ORGANIZA-TION | OTHERS | DATA CREATION DATE | DATA DELETION DATE | EFFICIENT START DATE | EFFICIENT COMPLETION DATE |
|---|---|---|---|---|---|---|---|
| 191 | A | B | | 02/01 | * | 04/01 | * |
| 192 | B | B1 | | 02/01 | * | 04/01 | * |
| 193 | : | : | | : | : | : | : |
| 194 | B | B3 | | 02/01 | * | 04/01 | * |
| 195 | C | C3 | | 02/01 | * | 04/01 | * |
| | | | | | | | |

FIG.20

FUNDAMENTAL | CHANGE HISTORY | EFFICIENT TERM

| | PARENT ORGANIZA-TION | CHILD ORGANIZA-TION | OTHERS | DATA CREATION DATE | DATA DELETION DATE | EFFICIENT START DATE | EFFICIENT COMPLETION DATE |
|---|---|---|---|---|---|---|---|
| 191 | A | B | | 02/01 | * | 04/01 | * |
| 192 | B | B1 | | 02/01 | * | 04/01 | * |
| 193 | : | : | | : | : | : | : |
| 204 | B | B3 | | 02/01 | 10/01 | 04/01 | * |
| 205 | B | B3 | | 10/01 | * | 04/01 | 12/01 |
| 206 | C | B3 | | 10/01 | * | 12/01 | * |
| 195 | C | C3 | | 02/01 | * | 04/01 | * |
| | | | | | | | |

FIG.21

| | PARENT ORGANIZA-TION | CHILD ORGANIZA-TION | OTHERS | DATA CREATION DATE | DATA DELETION DATE | EFFICIENT START DATE | EFFICIENT COMPLETION DATE |
|---|---|---|---|---|---|---|---|
| | \<-- FUNDAMENTAL --\> | | | \<-- CHANGE HISTORY --\> | | \<-- EFFICIENT TERM --\> | |
| 191 | A | B | | 02/01 | * | 04/01 | * |
| 192 | B | B1 | | 02/01 | * | 04/01 | * |
| 193 | : | : | | : | : | : | : |
| 204 | B | B3 | | 02/01 | 10/01 | 04/01 | * |
| 205 | B | B3 | | 10/01 | * | 04/01 | 12/01 |
| 216 | C | B3 | | 10/01 | 10/20 | 12/01 | * |
| 217 | D | B3 | | 10/20 | * | 12/01 | * |
| 218 | C | C3 | | 02/01 | 10/20 | 04/01 | * |
| 219 | C | C3 | | 10/20 | * | 04/01 | 12/01 |
| 21A | D | C3 | | 10/20 | * | 12/01 | * |
| 21B | A | D | | 10/20 | * | 12/01 | * |

FIG.22

| | PARENT ORGANIZA-TION | CHILD ORGANIZA-TION | OTHERS | DATA CREATION DATE | DATA DELETION DATE | EFFICIENT START DATE | EFFICIENT COMPLETION DATE |
|---|---|---|---|---|---|---|---|
| | \<-- FUNDAMENTAL --\> | | | \<-- CHANGE HISTORY --\> | | \<-- EFFICIENT TERM --\> | |
| 191 | A | B | | 02/01 | * | 04/01 | * |
| 192 | B | B1 | | 02/01 | * | 04/01 | * |
| 193 | : | : | | : | : | : | : |
| 205 | B | B3 | | 10/01 | * | 04/01 | 12/01 |
| 219 | C | C3 | | 10/20 | * | 04/01 | 12/01 |

| | PARENT ORGANIZA-TION | CHILD ORGANIZA-TION | OTHERS | DATA CREATION DATE | DATA DELETION DATE | EFFICIENT START DATE | EFFICIENT COMPLETION DATE |
|---|---|---|---|---|---|---|---|
| | FUNDAMENTAL | | | CHANGE HISTORY | | EFFICIENT TERM | |
| 191 | A | B | | 02/01 | * | 04/01 | * |
| 192 | B | B1 | | 02/01 | * | 04/01 | * |
| 193 | : | : | | : | : | : | : |
| 217 | D | B3 | | 10/20 | * | 12/01 | * |
| 21A | D | C3 | | 10/20 | * | 12/01 | * |
| 21B | A | D | | 10/20 | * | 12/01 | * |
| | | | | | | | |

| | PARENT ORGANIZA-TION | CHILD ORGANIZA-TION | OTHERS | DATA CREATION DATE | DATA DELETION DATE | EFFICIENT START DATE | EFFICIENT COMPLETION DATE |
|---|---|---|---|---|---|---|---|
| | FUNDAMENTAL | | | CHANGE HISTORY | | EFFICIENT TERM | |
| 191 | A | B | | 02/01 | * | 04/01 | * |
| 192 | B | B1 | | 02/01 | * | 04/01 | * |
| 193 | : | : | | : | : | : | : |
| 205 | B | B3 | | 10/01 | * | 04/01 | 12/01 |
| 217 | D | B3 | | 10/20 | * | 12/01 | * |
| 219 | C | C3 | | 10/20 | * | 04/01 | 12/01 |
| 21A | D | C3 | | 10/20 | * | 12/01 | * |
| 21B | A | D | | 10/20 | * | 12/01 | * |

| | FUNDAMENTAL | | | CHANGE HISTORY | | EFFICIENT TERM | |
|---|---|---|---|---|---|---|---|
| | PARENT ORGANIZA-TION | CHILD ORGANIZA-TION | OTHERS | DATA CREATION DATE | DATA DELETION DATE | EFFICIENT START DATE | EFFICIENT COMPLETION DATE |
| 191 | A | B | | 02/01 | * | 04/01 | * |
| 192 | B | B1 | | 02/01 | * | 04/01 | * |
| 193 | : | : | | : | : | : | : |
| 216 | C | B3 | | 10/01 | 10/20 | 12/01 | * |
| 218 | C | C3 | | 02/01 | 10/20 | 04/01 | * |
| | | | | | | | |

| | FUNDAMENTAL | | | CHANGE HISTORY | | EFFICIENT TERM | |
|---|---|---|---|---|---|---|---|
| | PARENT ORGANIZA-TION | CHILD ORGANIZA-TION | OTHERS | DATA CREATION DATE | DATA DELETION DATE | EFFICIENT START DATE | EFFICIENT COMPLETION DATE |
| 191 | A | B | | 02/01 | * | 04/01 | * |
| 192 | B | B1 | | 02/01 | * | 04/01 | * |
| 193 | : | : | | : | : | : | : |
| 216 | C | B3 | | 10/01 | 10/20 | 12/01 | * |
| 217 | D | B3 | | 10/20 | * | 12/01 | * |
| 218 | C | C3 | | 02/01 | 10/20 | 04/01 | * |
| 21A | D | C3 | | 10/20 | * | 12/01 | * |
| 21B | A | D | | 10/20 | * | 12/01 | * |

RETRIEVING APPARATUS, RETRIEVING METHOD, AND RETRIEVING PROGRAM OF HIERARCHICAL STRUCTURE DATA

BACKGROUND OF THE INVENTION

1. Field of the Invention

The invention relates to an apparatus, a method, and a program for storing and retrieving data showing a hierarchical structure such as product structure, organization structure, or the like. More particularly, the invention relates to an apparatus, a method, and a program in which when data that is used changes, stored data is consequently changed.

2. Description of the Related Arts

A method of handling a product structure which is changed has been disclosed as a change history management of production in JP-A-1999(Heisei 11)-66139 (Patent Document 1). In the invention, such a management is called an efficient date management.

A method of handling a product structure which is changed has been disclosed as a generation management and a version management in the Official Gazette of Japanese Patent No. 3547990 (Patent Document 2).

A method whereby in response to a change in production, data before the change and data of the changed portion after the change are managed and the data before the change and the data after the change are retrieved has been disclosed in the Official Gazette of Japanese Patent No. 3598026 (Patent Document 3). In the invention, such a management is called an efficient date management.

A general database management system has a function of recording a change history of data.

SUMMARY OF THE INVENTION

According to the above related arts, the method of managing the change in data on the basis of one date (time and day) and the retrieving the data has been disclosed.

Although the date when the data is formed and the date when the data is used are independent, it is impossible to retrieve the data while distinguishing both viewpoints of a difference of the data depending on a difference between the dates when the data is formed and a difference of the data depending on a difference between the dates when the data is used, and only the retrieval based on the date when the data is used has been disclosed.

The invention intends to provide an apparatus, a method, and a program for managing hierarchical structure data on the basis of a data change date and an efficient (i.e., effective) date and enabling histories of the data change and changes in efficient (i.e., effective) data to be retrieved and compared.

To accomplish the above object, according to the invention, there is provided a retrieving apparatus of hierarchical structure data, comprising: input means for inputting the hierarchical structure data showing a hierarchical structure and operation instruction data; data storing means for storing the inputted hierarchical structure data; data updating means for updating the hierarchical structure data stored in the data storing means on the basis of the hierarchical structure data and the operation instruction data which are inputted by the input means; and retrieving means for retrieving data which satisfies conditions from the hierarchical structure data stored in the data storing means on the basis of the operation instruction data which is inputted by the input means, wherein each of the data which is stored in the data storing means has items regarding an efficient date and items regarding a data change date, and the retrieving means has means for retrieving the data on the basis of the data regarding the efficient date and the data change date included in the operation instruction data which is inputted by the input means.

According to the invention, in the retrieving apparatus of the hierarchical structure data, the hierarchical structure data is constructed by part number data and product structure data showing an assembled product.

To accomplish the above object, according to the invention, there is provided a retrieving method of hierarchical structure data, comprising the steps of: inputting the hierarchical structure data showing a hierarchical structure and operation instruction data; storing the inputted hierarchical structure data into data storing means; updating the hierarchical structure data stored in the data storing means on the basis of the hierarchical structure data and the operation instruction data which are inputted; and retrieving data which satisfies conditions from the hierarchical structure data stored in the data storing means on the basis of the inputted operation instruction data, wherein each of the data which is stored in the data storing means has items regarding an efficient date and items regarding a data change date, and the data is retrieved on the basis of the data regarding the efficient date and the data change date included in the inputted operation instruction data.

According to the invention, in the retrieving method of the hierarchical structure data, the hierarchical structure data is constructed by part number data and product structure data showing an assembled product.

To accomplish the above object, according to the invention, there is provided a program for allowing a computer to execute: an inputting function of inputting hierarchical structure data showing a hierarchical structure and operation instruction data; a data storing function of storing the inputted hierarchical structure data; a data updating function of updating the hierarchical structure data stored by the data storing function on the basis of the hierarchical structure data and the operation instruction data which are inputted by the inputting function; and a retrieving function of retrieving data which satisfies conditions from the hierarchical structure data stored by the data storing function on the basis of the operation instruction data which is inputted by the inputting function, wherein each of the data which is stored by the data storing function has items regarding an efficient date and items regarding a data change date, and executing the computer retrieving the data on the basis of the data regarding the efficient date and the data change date included in the operation instruction data which is inputted by the inputting function.

According to the invention, in the program for allowing the computer to execute the retrieving function, the hierarchical structure data is constructed by part number data and product structure data showing an assembled product.

According to the invention, it is possible to provide the apparatus, method, and program which can independently handle the change history and the efficient date of the hierarchical structure data and retrieve and compare the history of the data change and the change in efficient data.

Other objects, features and advantages of the invention will become apparent from the following description of the embodiments of the invention taken in conjunction with the accompanying drawings.

BRIEF DESCRIPTION OF THE DRAWINGS

FIG. 6 shows an example of part number data;

FIG. 7 shows an example of product structure data;

FIG. 8 shows an example of part number data;

FIG. 9 shows an example of product structure data;

FIG. 10 shows an example of part number data;

FIG. 11 shows an example of product structure data;

FIG. 12 shows an example of part number data;

FIG. 19 shows an example of organization data;

FIG. 20 shows an example of organization data;

FIG. 21 shows an example of organization data;

FIG. 22 shows an example of retrieval result data of the organization data;

DETAILED DESCRIPTION OF THE EMBODIMENTS

Embodiments of the invention will be described hereinbelow with reference to the drawings.

Figure 1:
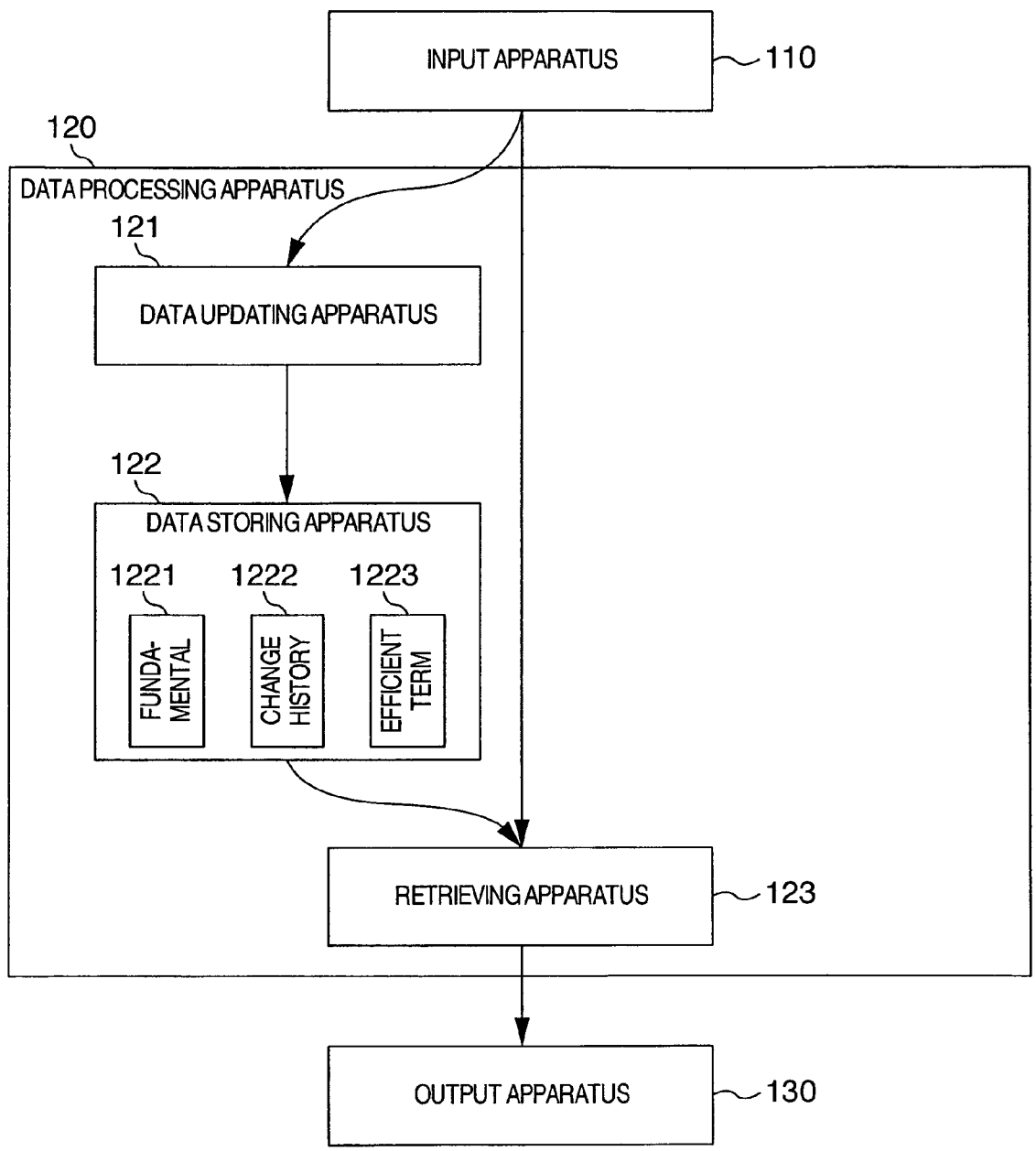
FIG. 1 is a constructional diagram of a retrieving apparatus of hierarchical structure data according to the first embodiment of the invention.

FIG. 1 is a constructional diagram of a data retrieving apparatus showing the typical first embodiment of the invention. The data retrieving apparatus is constructed by an input apparatus (110), a data processing apparatus (120), and an output apparatus (130). Although it is preferable to construct the data processing apparatus (120) by a general-purpose computer and a program for realizing the invention, it can be also realized as a dedicated processing apparatus. Although the program is recorded in a main storage in the data processing apparatus and executed in a preferred construction, it can be also constructed as a portable program by using a CD-ROM or the like. The program recorded in a portable medium may be stored into another program storing unit and executed. Further, the above program can be also transmitted to another apparatus through a communicating apparatus and used by the apparatus of a transmitting destination side.

The input apparatus (110) is an apparatus for receiving an instruction for processes. The processes include a process for updating data and a process for retrieving the data. In the updating process, the data to be updated is inputted from the input apparatus (110) together with the instruction data. In the retrieving process, an instruction to specify data serving as a source for the retrieval, conditions regarding a change history, and conditions regarding an efficient (i.e., effective) term can be designated. The updating and retrieving instructions can be made by the operator in an interactive manner or it is possible to connect the apparatus to another computer system or the like and instruct them through the communicating apparatus. When an instruction to designate the data serving as a source for the retrieval is made, fundamentally, a symbol or a name of the top of a hierarchical structure is designated. As a more preferable method, there is also a method of instructing a part of the number or name and instructing to select a desired one of a plurality of candidates which were retrieved and outputted.

As shown in FIG. 1, the data processing apparatus (120) is constructed by a data updating apparatus (121), a data storing apparatus (122), and a retrieving apparatus (123). A fundamental portion (1221), a change history portion (1222), and an efficient (i.e., effective) term portion (1223) exist in data recorded in the data storing apparatus.

The data processing apparatus (120) executes the following two kinds of processes on the basis of the instructions received in the input apparatus (110). The first process is a process for updating the data recorded in the data storing apparatus (122) by the data updating apparatus (121) on the basis of the instructions. The fundamental portion (1221) is a portion showing the hierarchical structure and is generally expressed by a parent/child relation or the like. The change history portion (1222) is a portion showing the date (time and day) when the data updating process has been executed. It is preferable to use a method of recording the time when the data updating has been instructed by the input apparatus (110). In the case where the input apparatus has been connected to another computer system or the like, it is also possible to use a method of recording the time when the data updating has been instructed to such a computer system. The efficient term portion (1223) is a portion showing the date (time and day) when the data becomes efficient. For example, when the data which will become efficient in future is formed, the date when the data is formed is recorded into the change history portion (1222) and the date when the data becomes efficient is recorded into the efficient term portion (1223).

Figures 13, 14:
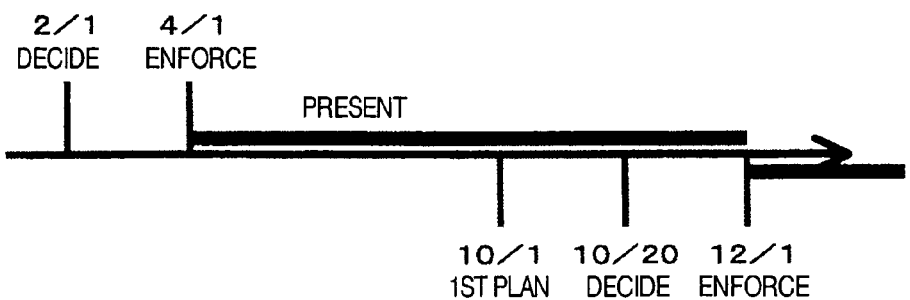
FIG. 13 shows an example of product structure data.
FIG. 14 is an explanatory diagram of a relation between a data change date and an efficient date.
Figure 15:
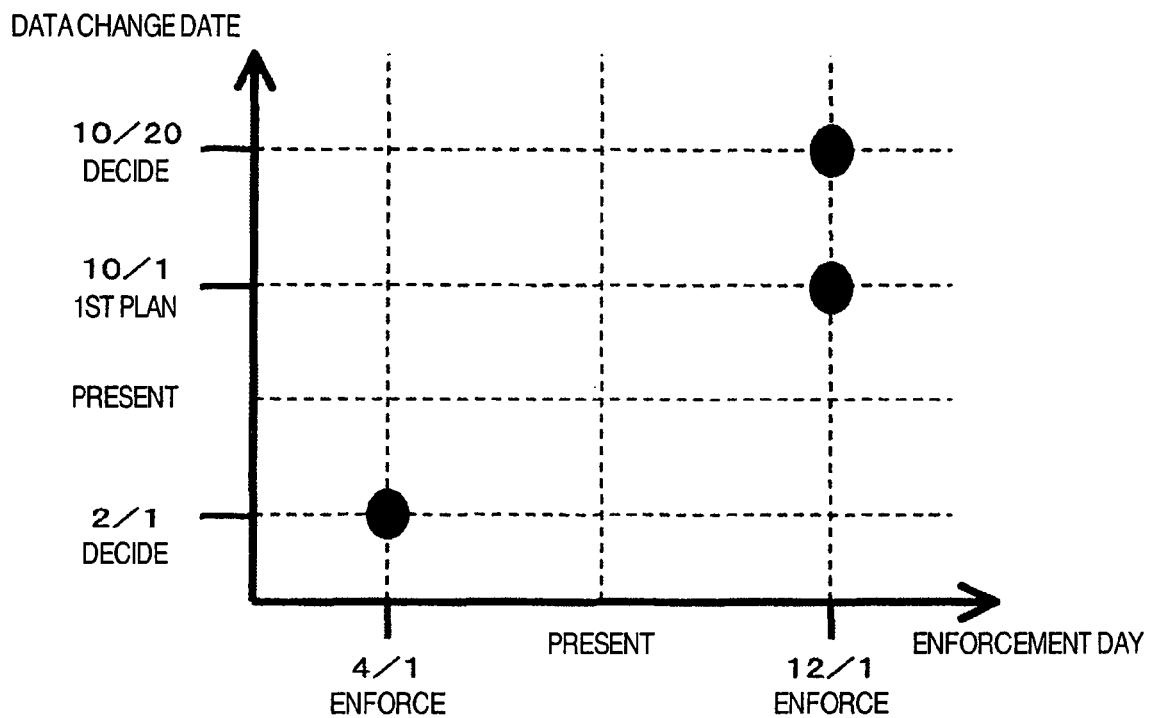
FIG. 15 is an explanatory diagram of the relation between the data change date and the efficient date.

As a specific example, there is a case of handling data of an organization such as a company or the like. As shown in FIG. 14, it is now assumed that the present organization has been enforced on April 1st (expressed as "4/1" for simplicity) of this year and the organization had been determined on February 1st. It is also assumed that the next organization change is performed on December 1st and, as its plan, a first plan is made on October 1st and determined on October 20th. Such a flow is as shown in FIG. 15 when the enforcement day is expressed in horizontal axis and the data change date is expressed in vertical axis.

Figure 16:
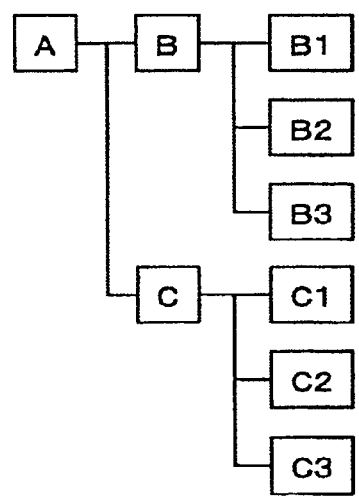
FIG. 16 is a diagram of organization data for use in explanation.

Examples of the present organization data which has been presumed as mentioned above will now be described with reference to FIGS. 16 and 19. In FIG. 16, the left side indicates an upper layer and the right side indicates a lower layer, thereby forming a hierarchical structure. FIG. 19 is the example of the data showing the hierarchical structure of FIG. 16 stored in the data storing apparatus (122). A column of "parent organization" indicates the upper organizations and a column of "child organization" indicates the lower organizations. With respect to all data rows, the fact that the data has been formed on February 1st has been recorded in the change history portion (1222) and the day when the data is deleted is recorded there as "*" showing that such a day is undecided. The fact that the efficient term is started on April 1st has been recorded in the efficient term portion (1223) and the day of completion is recorded there as "*" showing that such a day is undecided. Those data has been recorded by the data updating apparatus (121) on the basis of the instructions made by the input apparatus (110).

Figure 17:
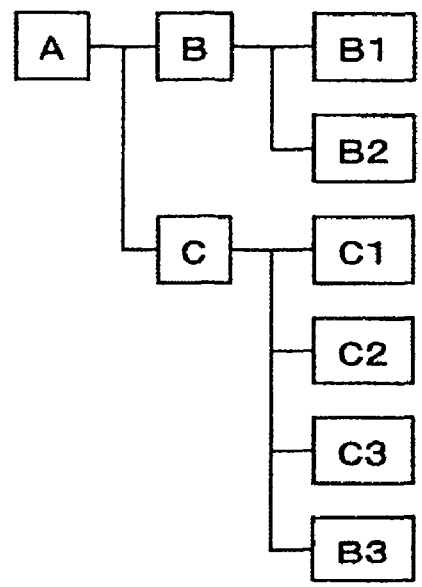
FIG. 17 is a diagram of organization data for use in explanation.

It is assumed that the first plan of the organization after December 1st shown in FIG. 17 has been formed on October 1st. The contents of the this plan indicate a change plan in which the organization of B3 is changed from B to C. When such a change instruction is made by the input apparatus (110), the data updating apparatus (121) changes the data recorded in the data storing apparatus (122) on the basis of such an instruction. In this example, the data shown in FIG. 19 is changed to data as shown in FIG. 20. Specifically speaking, the data of the row "194" is replaced by the data of the rows "204, 205, and 206". The data of the row "194" denotes that B3 belongs to B, this data has been formed on February 1st, the day when it is deleted is undecided, the efficient term starts on April 1st, and the term of completion is undecided. The data after the change in FIG. 20 shows the following contents. The data of the row "204" denotes that B3 belongs to B for a period of time from February 1st to October 1st in the state where the day of completion is undecided after April 1st. The data of the rows "205 and 206" shows the data changed on October 1st and denotes that B3 belongs to B for a period of time from April 1st to December 1st and B3 belongs to C after December 1st.

Figure 18:
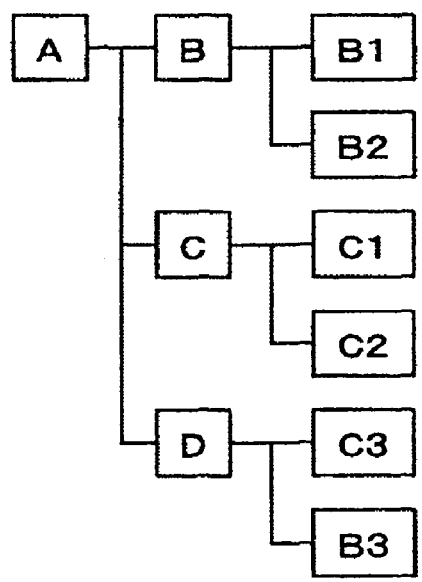
FIG. 18 is a diagram of organization data for use in explanation.

It is assumed that the first plan of the organization after December 1st shown in FIG. 17 has been changed to a plan of FIG. 18 on October 20th. The contents of this plan indicate a plan in which the organization of B3 is not changed to C but an intermediate organization of D is newly provided, and B3 and C3 are changed there. When such a change instruction is made by the input apparatus (110), the data updating apparatus (121) changes the data recorded in the data storing apparatus (122) on the basis of such an instruction. In this example, the data shown in FIG. 20 is changed to data as shown in FIG. 21. Specifically speaking, the data of the row "206" is replaced by the data of the rows "216 and 217", the data of the row "195" is replaced by the data of the rows "218, 219, and 21A", and the data of the row "21B" is added. The data of the row "206" denotes that the data showing that B3 belongs to C after December 1st has been formed on October 1st. In the data of the rows "216 and 217" after the change in FIG. 21, with respect to the belonging of B3 after December 1st, although it has been decided that B3 belongs to C for a period of time from October 1st to October 20th, it is changed so that it belongs to D after October 20th. The data of the row "195" denotes that the data showing that C3 belongs to C after April 1st has been formed on February 1st. The data after the change in FIG. 21 shows the following contents. The data of the row "218" denotes that C3 belongs to C for a period of time from February 1st to October 20th in the state where the day of completion is undecided after April 1st. The data of the rows "219 and 21A" shows the data changed on October 20th and denotes that C3 belongs to C for a period of time from April 1st to December 1st and C3 belongs to D after December 1st. The data of the row "21B" denotes that the data showing that D belongs to A after December 1st has been formed on October 20th.

In the example of the foregoing specific data, the parent/child relation and the data regarding the parent/child relation have been stored in the fundamental portion (1221) in the data storing apparatus (122), the data regarding the data change date has been stored in the change history portion (1222) in the data storing apparatus (122), and the data regarding the efficient term has been stored in the efficient term portion (1223) in the data storing apparatus (122), respectively.

Although the above explanation has been made on the assumption that the data which is stored in the data storing apparatus (122) is sequentially updated on the basis of the instruction, the following inputting methods are also presumed in the invention.

The first method is a method whereby the data of the fundamental portion, change history portion, and efficient term portion shown in FIG. 21 as a final state for retrieval is inputted in a lump from the beginning and stored. This method is a method whereby the data is formed by another apparatus different from the present apparatus of the invention and copied to the present apparatus.

The second method is a method whereby the apparatus of the embodiment has a timer apparatus therein, only the data in the fundamental portion and the efficient term portion is received from the input apparatus, and at the time when the updating is instructed, the data in the change history portion is updated by using the time measured by the timer apparatus.

According to the second process, the data which satisfies the conditions is retrieved from the data recorded in the data storing apparatus (122) on the basis of the instructions by the retrieving apparatus (123) and a retrieval result is sent to the output apparatus (130). The retrieving conditions include conditions regarding the change history and conditions regarding the efficient date as well as conditions to specify a necessary portion of the hierarchical structure data. As conditions of the change history and the efficient date, there are a case where they are set to one time, a case where they are set to a plurality of times, and a case where they are set to a period of time between two times. Generally, the following usages are common. For example, one time of day is designated as the retrieving condition when retrieving data of a specific time of day. And, pluralities of times of day are designated when comparing data of a plurality of specific times of day. Furthermore, time period designated by two times of day are designated as the retrieving condition when collectively retrieving data alteration or data change within an availability period.

In the example of the organization data mentioned above, by using the updated latest data, for example, the following retrieval can be made.

A retrieval of the data of the organization which is efficient on October 10th by the data as of November 1st. This means that after the data which becomes efficient after December 1st was registered on October 20th, the past data is retrieved. Such a retrieval can be processed by extracting the data in which the change history includes November 1st and the efficient term includes October 10th in FIG. 21 showing the latest data. A result obtained by executing such an extracting process becomes data shown in FIG. 22 in which B3 belongs to B and C3 belongs to C. This data corresponds to the data shown in FIG. 16.

Similarly, a retrieval of the data of the organization which is efficient on December 10th by the data as of November 1st. This means that although it is the same data as that of November 1st mentioned above, the data which is obtained after the organization was changed is retrieved. Such a retrieval can be processed by extracting the data in which the change history includes November 1st and the efficient term includes December 10th in FIG. 21 showing the latest data. A result obtained by executing such an extracting process becomes data shown in FIG. 23 in which B3 and C3 belong to the new organization D. This data corresponds to the data shown in FIG. 18.

Figures 23, 24:
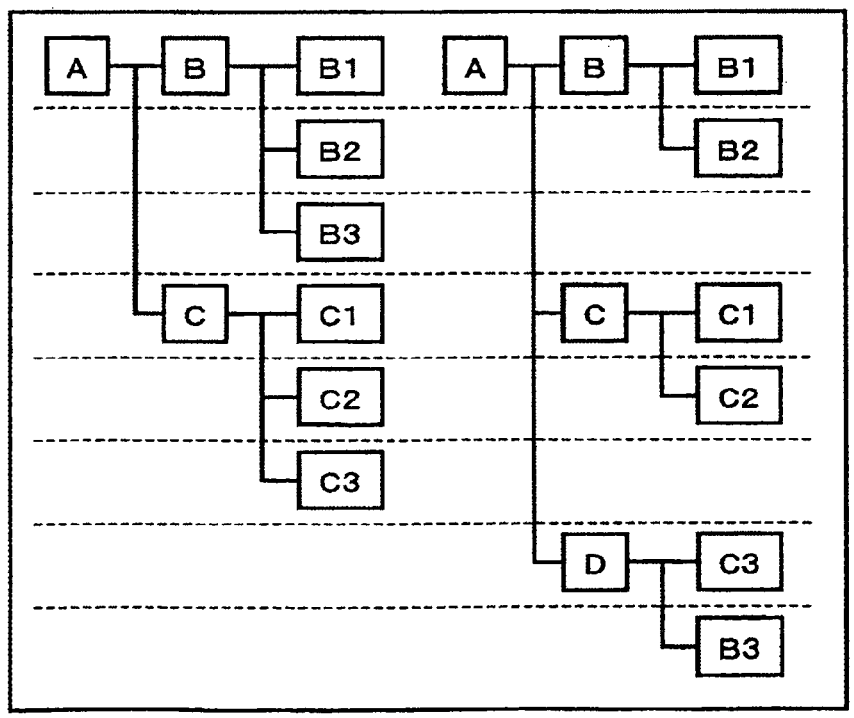
FIG. 23 shows an example of retrieval result data of the organization data.
FIG. 24 shows an example of a display screen output of a retrieval result of the organization data.

If November 1st is designated as a condition of the change history and a plurality of days (October 10th and December 10th) are designated as a condition of the efficient date, both of the data of FIG. 22 and the data of FIG. 23 are collectively retrieved. They are the data shown in FIGS. 16 and 18 and can be outputted in an easy-to-compare form by the output apparatus (130) by a method whereby, for example, upper and lower positions of the corresponding organization are aligned as shown in FIG. 24.

Figures 25, 26:
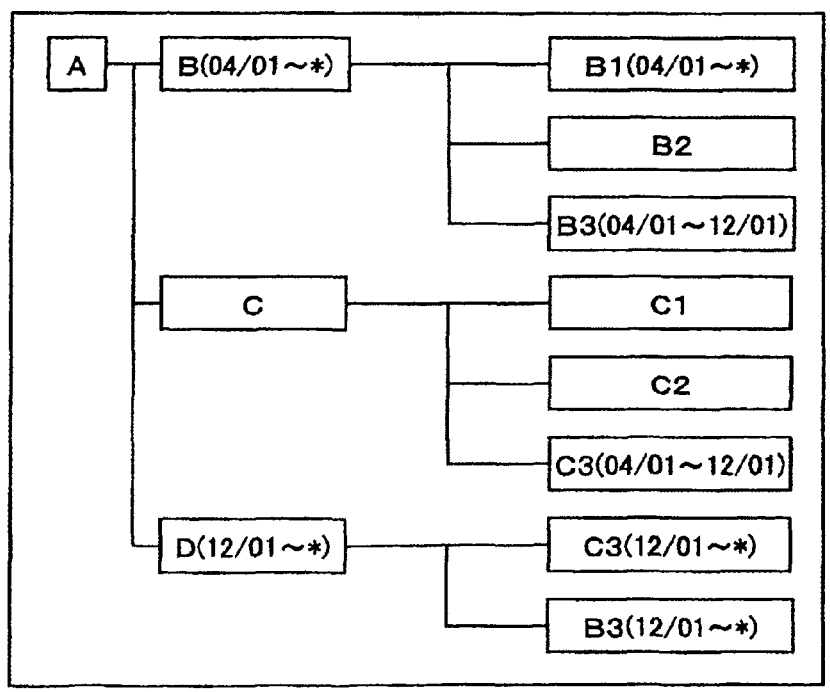
FIG. 25 shows an example of retrieval result data of the organization data.
FIG. 26 shows an example of a display screen output of a retrieval result of the organization data.

If November 1st is designated as a condition of the change history and a period of time from October 10th to December 10th is designated as a condition of the efficient date, the data within such a period of time is retrieved. A result of this retrieval comprehends how the efficient organization is changed for such a period of time. If a long period of time is set, the changing times can be referred to. Such a retrieval can be processed by extracting the data in which the change history includes November 1st, the efficient start date is before December 10th, and the efficient day of completion is after October 10. A result obtained by executing such an extracting process becomes data shown in FIG. 25. This data can be outputted in an easy-to-compare form by the output apparatus (130) by a method whereby, for example, the efficient term is written together with the data as shown in FIG. 26.

In a manner similar to the first example, a retrieval of the data of the organization which is efficient on December 10th by the data as of October 10th. Although the efficient date of this data is the same as that in the first example, the data change date differs. Such a retrieval can be processed by extracting the data in which the change history includes October 10th and the efficient term includes December 10th in FIG. 21 showing the latest data. A result obtained by executing such an extracting process becomes data shown in FIG. 27 in which B3 and C3 belong to the organization C. This data corresponds to the data shown in FIG. 17.

Figures 27, 28:
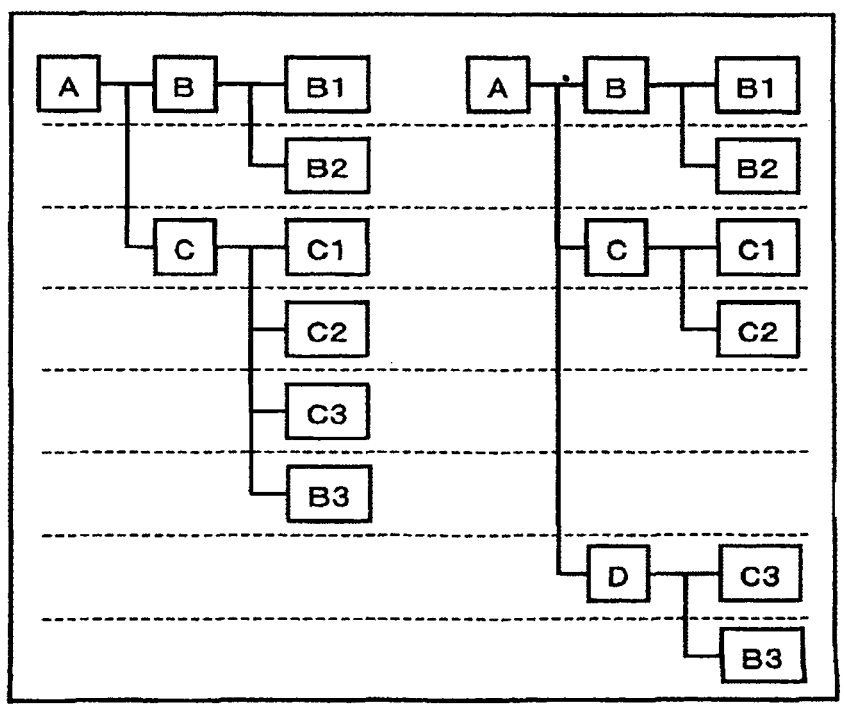
FIG. 27 shows an example of retrieval result data of the organization data.
FIG. 28 shows an example of a display screen output of a retrieval result of the organization data.

If a plurality of days (October 10th and November 1st) are designated as a condition of the change history and December 10th is designated as a condition of the efficient date, both of the data of FIG. 27 and the data of FIG. 23 are collectively retrieved. Such a retrieval is performed to know how the data which becomes efficient on December 10th has been changed in the plan of October 10th and the plan of November 10th. A result of the retrieval becomes the data shown in FIGS. 17 and 18 and can be outputted in an easy-to-compare form by the output apparatus (130) by a method whereby, for example, the upper and lower positions of the corresponding organization are aligned as shown in FIG. 28.

Figures 29, 30:
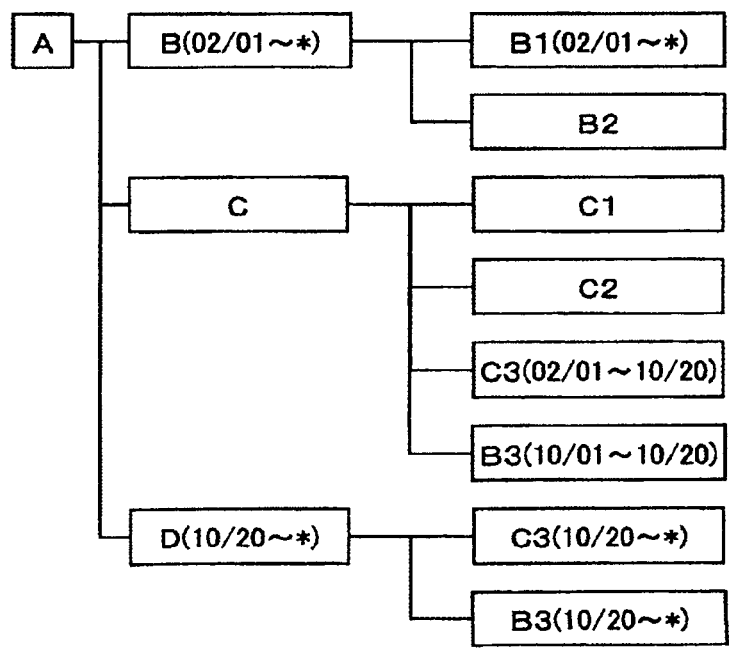
FIG. 29 shows an example of retrieval result data of the organization data.
FIG. 30 shows an example of a display screen output of a retrieval result of the organization data.

If a period of time from October 10th to November 1st is designated as a condition of the change history and December 10th is designated as a condition of the efficient date, the data within such a period of time is retrieved. Such a retrieval is performed to know how the data which becomes efficient on December 10th has been changed for a period of time from October 10th to November 1st. Even if the data was temporarily changed and subsequently returned to the original contents, it is also retrieved. Therefore, if the operator is additionally recorded, by whom, when, and how the data has been changed can be comprehensively retrieved. A result of this retrieval becomes data shown in FIG. 29. This data can be outputted in an easy-to-compare form by the output apparatus (130) by a method whereby, for example, the date when it has been changed and the date when it has been deleted are written together with the data as shown in FIG. 30. Although the output form is the same as that in FIG. 26, FIG. 26 shows the contents of the retrieval showing how the efficient organization has been changed. FIG. 30 shows the contents of the retrieval showing how the data has been changed. Their display meanings differ. It is preferable to use a method of outputting them in different output forms, a method of displaying them in different colors, or the like so that they can be easily distinguished.

Although the embodiment has been described with respect to the example in which either the change history or the efficient date is set to one time, the invention is not limited to such an example. For instance, in the case where both of them have the conditions of a plurality of days, the history in which the data of a plurality of efficient dates have been changed is retrieved.

The expressing method of the data of month and day described in the above specific example is not particularly limited in the invention. According to a preferred example, it is assumed that the time is expressed and it is proper to regard the date "October 1st" as "October 1st, at 0:0 am, 0 sec". By using such a system, since one data shows the instantaneous time, the expression of the range becomes clear. Substantially the same processes can be executed even if the relative order is shown by numbers indicative of the order in place of the date and such an example is also incorporated in the targets of the invention.

The output apparatus (130) is an apparatus for outputting the data retrieved by the retrieving apparatus. Although it is preferable to use a display screen as an output destination, there can be a case of outputting the data to a file, a case of outputting the data to another apparatus via communication, or the like. As an output form, the various conventional methods of accurately expressing the hierarchical structure data can be used. The comparison output or the like which has partially been mentioned above may be also performed.

Figure 31:
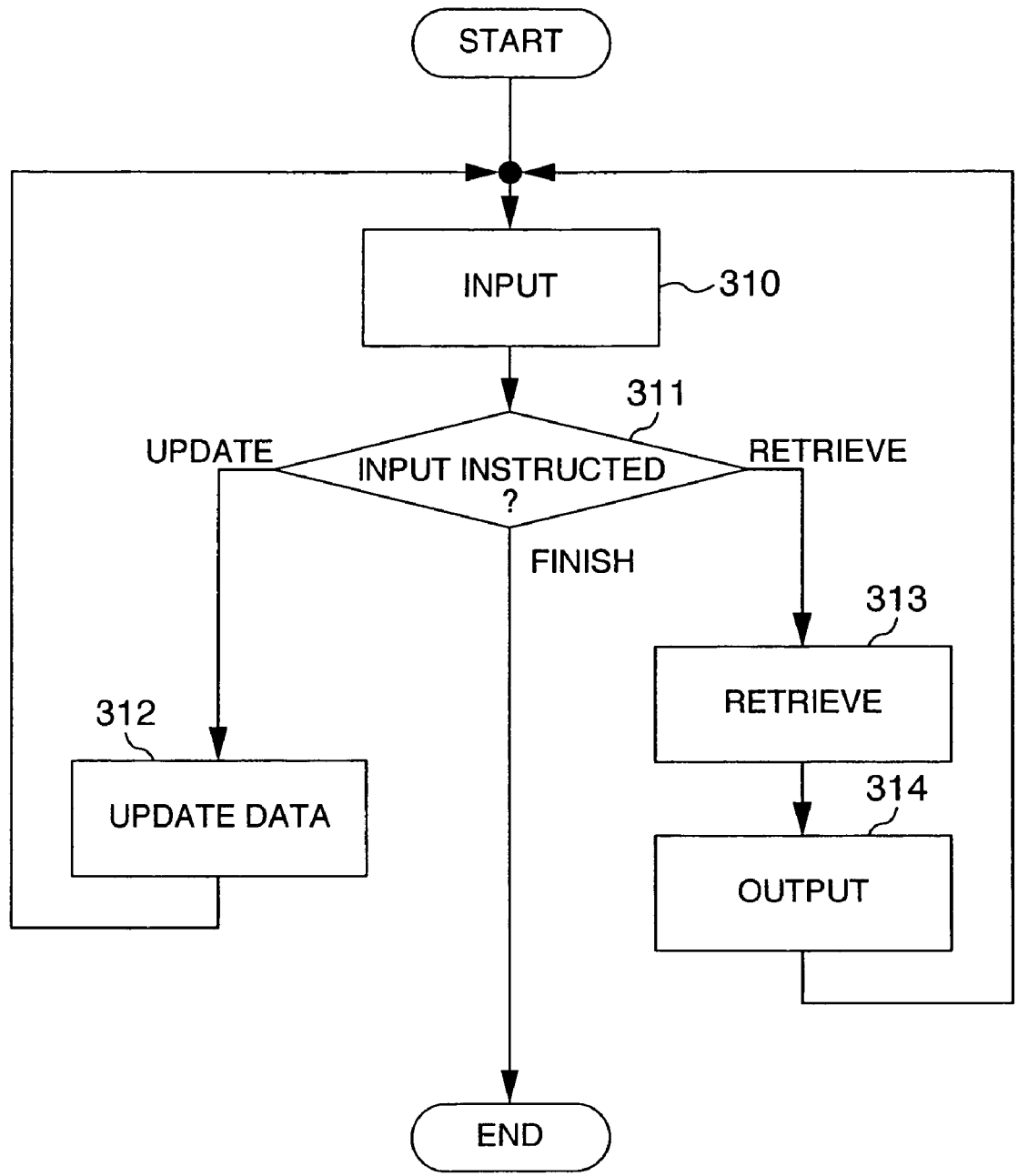
FIG. 31 is a flowchart for a retrieving method of the hierarchical structure data according to the embodiment of the invention.

A flow for processes of the embodiment will now be described with reference to FIG. 31.

When the process is started, first, the input is received by the input apparatus (110) (step 310).

If the input is a data updating instruction, the data is updated by the data updating apparatus (121) (step 312) and the input apparatus enters a standby mode of receiving the next input.

If the input is a retrieving instruction, the retrieval is performed by the retrieving apparatus (123) (step 313), a result of the retrieval is outputted by the output apparatus (130) (step 314), and the input apparatus enters the standby mode of receiving the next input. In the case of the retrieving instruction, the data showing the conditions regarding the change history and the efficient date is also inputted and the retrieving process is executed on the basis of those data.

If the input is an end instruction, the processing routine is finished.

The second embodiment of the invention relates to an example in which part number data (PN) and product structure data (PS) showing a product structure of an assembled product are handled as hierarchical structure data.

Figure 2:
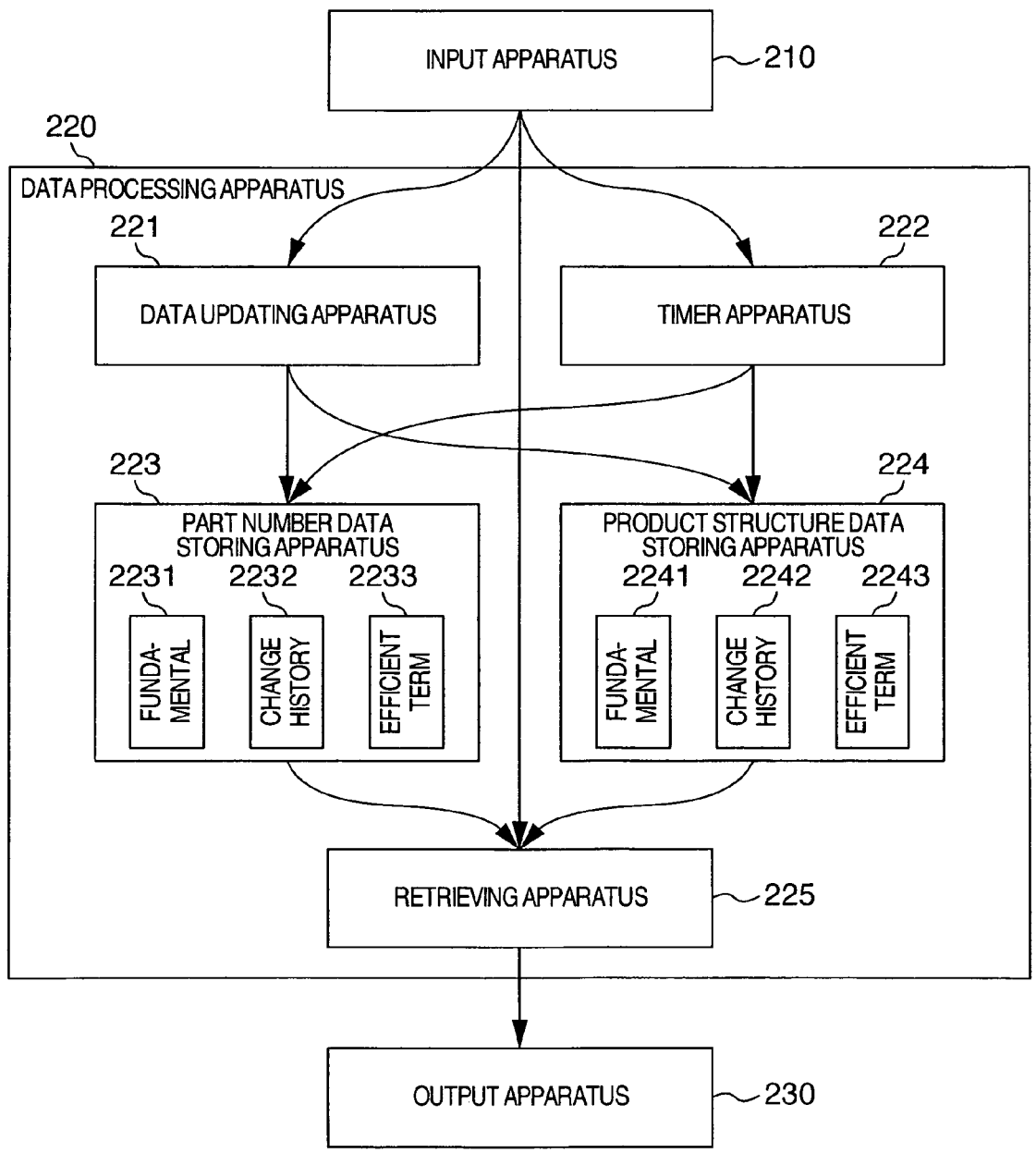
FIG. 2 is a constructional diagram of a retrieving apparatus of hierarchical structure data according to the second embodiment of the invention.

FIG. 2 is a constructional diagram of a data retrieving apparatus showing the second embodiment. The data retrieving apparatus is constructed by an input apparatus (210), a data processing apparatus (220), and an output apparatus (230). Although it is preferable to construct the data processing apparatus (220) by a general-purpose computer and a program for realizing the invention, it can be also realized as a dedicated processing apparatus. Although the program is recorded in a main storage in the data processing apparatus and executed in a preferred construction, it can be also constructed as a portable program by using a CD-ROM or the like. The program recorded in a portable medium may be stored into another program storing unit and executed. Further, the above program can be also transmitted to another apparatus through a communicating apparatus and used by the apparatus of a transmitting destination side.

The input apparatus (210) is an apparatus for receiving an instruction for processes. The processes include a process for updating data and a process for retrieving the data. In the updating process, the data to be updated is inputted from the input apparatus (210) together with the instruction data. In the retrieving process, an instruction to specify data serving as a source for the retrieval, conditions regarding the change history, and conditions regarding the efficient term can be designated. The updating and retrieving instructions can be made by the operator in an interactive manner or it is possible to connect the apparatus to another computer system or the like and instruct them through the communicating apparatus. When an instruction to specify the data serving as a source for the retrieval is made, fundamentally, a symbol or a name of the top of the hierarchical structure is designated. As a more preferable method, there is also a method of instructing a part of the number or name and instructing to select a desired one of a plurality of candidates which were retrieved and outputted.

As shown in FIG. 2, the data processing apparatus (220) is constructed by a data updating apparatus (221), a timer apparatus (222), a part number data storing apparatus (223), a product structure data storing apparatus (224), and a retrieving apparatus (225). A fundamental portion (2231), a change history portion (2232), and an efficient term portion (2233) exist in data recorded in the part number data storing apparatus (223). A fundamental portion (2241), a change history portion (2242), and an efficient term portion (2243) exist in data recorded in the product structure data storing apparatus (224).

The data processing apparatus (220) executes the following two kinds of processes on the basis of the instructions received in the input apparatus (210). The first process is a process for updating the data recorded in the part number data storing apparatus (223) and the product structure data storing apparatus (224) by the data updating apparatus (221) on the basis of the instructions. The fundamental portion (2231) in the part number data storing apparatus is a portion showing the fundamental data of the part and the part number and the part name have generally been recorded there. The change history portion (2232) in the part number data storing apparatus is a portion showing the date (time and day) when the data updating process has been executed. It is preferable to use a method of recording the time when the data updating has been instructed by the input apparatus (210). In the case where the input apparatus has been connected to another computer system or the like, it is also possible to use a method of recording the time when the data updating has been instructed to such a computer system. There is also a method of recording time data which is outputted from the timer apparatus (222). The efficient term portion (2233) in the part number data storing apparatus is a portion showing the date (time and day) when the data becomes efficient. For example, when the data which will become efficient in future is formed, the date when the data is formed is recorded into the change history portion (2232) and the date when the data becomes efficient is recorded into the efficient term portion (2233). The fundamental portion (2241) in the product structure data storing apparatus is a portion showing the fundamental data of the product structure and a parent/child relation of the part has generally been recorded there. The change history portion (2242) in the product structure data storing apparatus is a portion showing the date (time and day) when the data updating process has been executed. It is preferable to use a method of recording the time when the data updating has been instructed by the input apparatus (210). In the case where the input apparatus has been connected to another computer system or the like, it is also possible to use a method of recording the time when the data updating has been instructed to such a computer system. There is also a method of recording the time data which is outputted from the timer apparatus (222). The efficient term portion (2243) in the product structure data storing apparatus is a portion showing the date (time and day) when the data becomes efficient. For example, when the data which will become efficient in future is formed, the date when the data is formed is recorded into the change history portion (2242) and the date when the data becomes efficient is recorded into the efficient term portion (2243).

Figure 3:
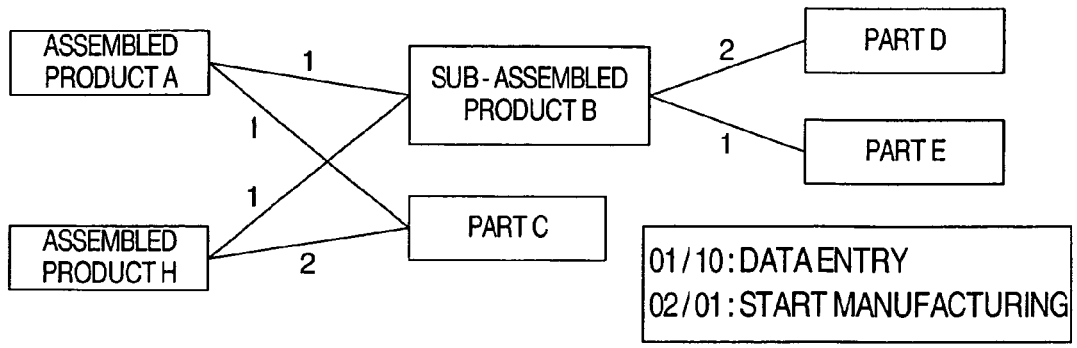
FIG. 3 is a diagram of product data for use in explanation.

The process for updating the data will now be described by using an example of the specific data. FIG. 3 shows an example of a product structure constructed by a plurality of assembled products, a sub-assembled product, and parts. The left side shows the parent and the right side indicates the child. The "part" as a broad meaning is a general name of the assembled product, the sub-assembled product, and the parts. Each portion shown by a rectangle indicates the part. A straight line connecting the parts indicates the parent/child relation and a numeral written beside it indicates the number of child parts. For example, the sub-assembled product B has two parts D and one part E as child parts. It is presumed that the data with the construction shown in FIG. 3 is registered on January 10th and the product is manufactured from February 1st on the basis of the data. That is, the date when the data has been updated (changed) is January 10th and the date when the data becomes efficient is February 1st.

Figure 4:
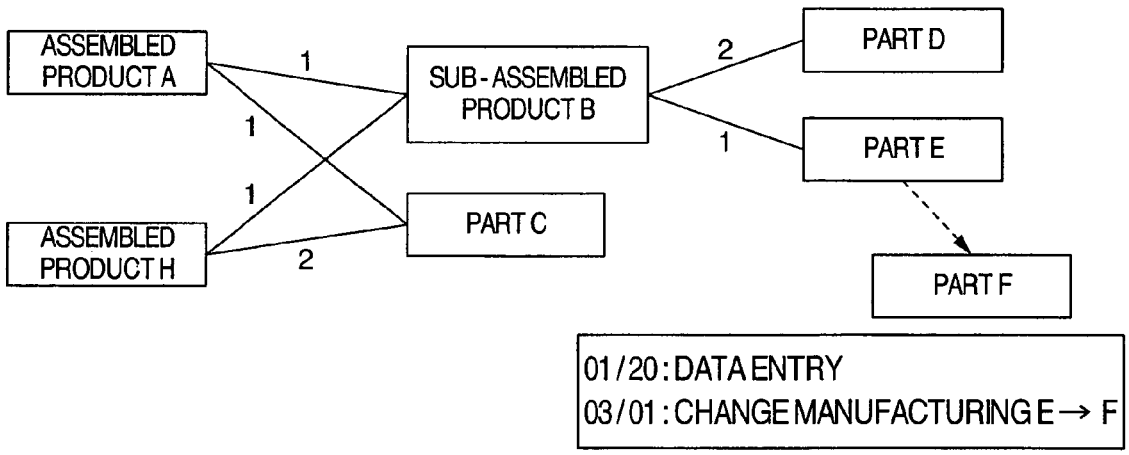
FIG. 4 is a diagram of the product data for use in explanation.

FIG. 4 shows a modification of FIG. 3 and shows that the modification in which a part F is used in place of the part E for the product which is manufactured from March 1st has been made on January 20th.

Figure 5:
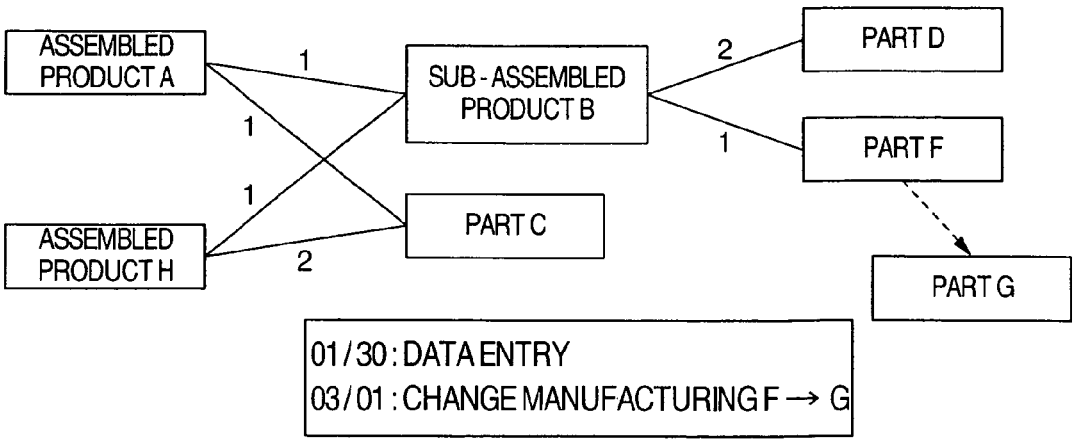
FIG. 5 is a diagram of the product data for use in explanation.

FIG. 5 shows the state where the construction of FIG. 4 has further been modified. FIG. 5 shows the following state: although it is scheduled to replace the part E by the part F from March 1st, it is changed that the part F is replaced by a part G on the same day, that is, a modification to replace the part E by the part G from March 1st has been made on January 30th. In other words, it is presumed that although it is temporarily scheduled to change the part E to the part F on January 20th, such a schedule is not actually applied but stopped and it is decided that the part E is changed to the part G.

FIG. 6 shows a part of the part number data showing the product data shown in FIG. 3. The data of one row shows one part. The part number and the part name are recorded in the fundamental portion. The dates of the creation and the deletion of the data are recorded in the change history portion. The efficient start and completion dates are recorded in the efficient term portion. It is presumed that various kinds of data such as kind of material of the part, its procurement destination, and the like are recorded in other columns of the fundamental portion in accordance with the object. The invention does not limit the using method to this portion. January 1st when the data has been registered is recorded in the column of the data creation date in the change history portion. Since the data is not deleted, * is recorded in the column of the data deletion date. February 1st when the manufacturing of the product is started is recorded in the efficient start date. Since the date when the manufacturing of the product is completed is undecided, * is recorded in the completion date.

FIG. 7 shows a part of the product structure data showing the product data shown in FIG. 3. The data of one row indicates the parent/child relation. A parent part number, a child part number, the number of child numbers, and others are recorded in the fundamental portion. The creation and deletion dates of the data are recorded in the change history portion. The efficient start and completion dates are recorded in the efficient term portion. January 10th when the data has been registered is recorded in the column of the data creation date in the change history portion. Since the data is not deleted, * is recorded in the column of the data deletion date. February 1st when the manufacturing of the product is started is recorded in the efficient start date. Since the date when the manufacturing of the product is completed is undecided, * is recorded in the completion date.

FIG. 8 shows a part of the part number data corresponding to FIG. 4. Since the data showing that the part E is exchanged to the part F on March 1st has been registered on January 20th, data (86) of the part F which is newly necessary has been added to the part number data. The data start date of such data is January 20th when the data has been added and the efficient start date is March 1st.

FIG. 9 shows a part of the product structure data corresponding to FIG. 4. Since the part E is exchanged to the part F on March 1st, data 74 is replaced by: data (94) showing that the data indicating that the parent/child relation between the parts B and E continues permanently from February 1st has existed from January 10th to January 20th; data (95) showing that the data indicating that the parent/child relation between the parts B and E exists from February 1st to March 1st has been formed on January 20th; and data (96) showing that the data indicating that the parent/child relation between the parts B and F exists after March 1st has been formed on to January 20th.

Similarly, when the product structure changes from FIG. 4 to FIG. 5, the part number data changes from FIG. 8 to FIG. 10 and the product structure data changes from FIG. 9 to FIG. 11.

Processes at the time when other data in the part number data, for example, the procurement destination has been changed will now be described. It is assumed that the product structure is not changed as shown in FIG. 5 and a modification in which the procurement destination recorded in the part D is changed from P to Q after March 20th has been performed on February 1st. In this case, since the structure is not changed, as shown in FIG. 13, the product structure data is not changed from FIG. 11. As shown in FIG. 12, the part number data is changed from 64 to 124-126. That is, the data (64) showing that the procurement destination of the part D is permanently P after February 1st has been registered on January 10th is changed to data showing that the setting indicating that the procurement destination is permanently P after February 1st is changed to a setting in which it is set to P from January 10th to February 10th (124) and, in the data after February 10th, the procurement destination is set to P from February 1st to March 20th (125) and is set to Q after March 20th (126).

In the above description, it is assumed that the data which is stored in the part number data storing apparatus (223) and the product structure data storing apparatus (224) is sequentially updated on the basis of the instruction. However, in the invention, there is also presumed a method whereby the part number data and the product structure data shown in FIGS. 12 and 13 as a final state for retrieval are inputted and stored in a lump from the beginning in the state where the fundamental portion, the change history portion, and the efficient term portion have been added. Such a method corresponds to a form in which the data is formed by another apparatus different from the invention and the data is copied to the present apparatus. In this case, the timer apparatus (222) is unnecessary in the apparatus of the invention.

According to the second process, the data which satisfies the conditions is retrieved from the data recorded in the part number data storing apparatus (223) and the product structure data storing apparatus (224) on the basis of the instructions by the retrieving apparatus (225) and a retrieval result is sent to the output apparatus (230). The retrieving conditions and the retrieving process are almost similar to those in the first embodiment. When the instructions of the specific date, a plurality of dates, a term, and the like are received with respect to the change history and the efficient date, the data in which the dates designated for the data recorded in the part number data storing apparatus (223) and the product structure data storing apparatus (224) satisfies the designated conditions is extracted and outputted by the output apparatus (230).

The invention is used in an apparatus, a method, and a program for storing and retrieving the data showing the hierarchical structure such as product structure, organization structure, or the like. For example, the invention can be used in a computer system for part management or the like, its using method, and its program.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A retrieving apparatus for retrieving hierarchical structure data, the retrieving apparatus being implemented by a computer and comprising:

an input means for inputting: parent-child relationship data defining hierarchical relationships between parent and child items, operation instruction data providing one or more instruction instructing at least one operation on the parent-child relationship data, and retrieval data defining a showing condition used for retrieving the parent-child relationship data;

a data storage means for storing the parent-child relationship data inputted by the input means;

a data updating means for updating the parent-child relationship data stored in the data storage means, in accordance with the operation instruction data inputted by the input means; and a retrieving output means for retrieving select said parent-child relationship data stored in the data storage means, in accordance with the showing condition defined by the retrieval data inputted by the input means; wherein the parent-child relationship data stored in the data storage means includes a data item concerned with an effective term defining a term for utilizing the data, and another data item concerned with a change term defining a changed term of the data where a data content is changed;

the retrieval data inputted by the input means has the showing condition instructing retrieval of one data concerned with the effective term, and two dates concerned with the changed term; and the retrieving output means retrieves two sets of parent-child relationship data, where the two sets of parent-child relationship data relate to the one data and include a changed condition at the two dates with respect to each other, and outputs two opposing hierarchical graphical representations corresponding to the two sets of parent-child relationship data, respectively, where hierarchical elements common to both said two opposing hierarchical graphical representations are aligned with each other for intuitive visual comparison thereof.

2. A retrieving apparatus for retrieving hierarchical structure data, the retrieving apparatus being implemented by computer and comprising:
an input means for inputting: parent-child relationship data defining hierarchical relationships between parent and child items, operation instruction data providing one or more instruction instructing at least one operation on the parent-child relationship data, and retrieval data for defining a showing condition used for retrieving the parent-child relationship data;
a data storage means for storing the parent-child relationship data inputted by the input means;
a data updating means for updating the parent-child relationship data stored in the data storage means, in accordance with the operation instruction data inputted by the input means; and
a retrieving output means for retrieving select said parent-child relationship data stored in the data storage means, in accordance with the showing condition defined by the retrieval data inputted by the input means; wherein
the parent-child relationship data stored in the data storage means includes a data item concerned with an effective term defining a term for utilizing the data, and another data item concerned with a change term defining a changed term of the data where a data content is changed;
the retrieval data inputted by the input means has the showing condition instructing retrieval of two dates concerned with the effective term, and one data concerned with the changed term, and
the retrieving output means retrieves two set of parent-child relationship data, where the two sets of parent-child relationship data relate to the one data and includes a changed condition at the two dates with respect to each other, and outputs two opposing hierarchical graphical representations corresponding to the two sets of parent-child relationship data, respectively, where hierarchical elements common to both said two opposing hierarchical graphical representations are aligned with each other for intuitive visual comparison thereof.

3. The retrieving apparatus of hierarchical structure data implemented by a computer according to claims 1 or 2, wherein the parent-child relationship data includes part number data and product structure data concerning an assembled product.

4. A retrieving method of retrieving hierarchical structure data, the retrieving method being implemented by a computer and comprising:
inputting, via an input means: parent-child relationship data defining hierarchical relationships between parent and child items, operation instruction data providing one or more instruction instructing at least one operation on the parent-child relationship data, and retrieval data defining a showing condition used for retrieving the parent-child relationship data;
storing the parent-child relationship data inputted by the input means in data storage means;
updating the parent-child relationship data stored in the data storage means, in accordance with the operation instruction data inputted by the input means; and
retrieving select said parent-child relationship data stored in the data storage means, in accordance with the showing condition defined by the retrieval data inputted by the input means; wherein
the parent-child relationship data stored in the data storage means includes a data item concerned with an effective term defining a term for utilizing the data, and another data item concerned with a change term defining a changed term of the data where a data content is changed;
the retrieval data inputted by the input means has the showing condition instructing retrieval of one data concerned with the effective term, and two dates concerned with the changed term; and
the retrieving retrieves two sets of parent-child relationship data, where the two sets of parent-child relationship data relate to the one data and include a changed condition at the two dates with respect to each other, and outputs two opposing hierarchical graphical representations corresponding to the two differing changed terms having differing parent-child relationship data, respectively, where hierarchical elements common to both said two opposing hierarchical graphical representations are aligned with each other for intuitive visual comparison thereof.

5. A retrieving method for retrieving hierarchical structure data, the retrieving method being implemented by computer and comprising:
inputting, via an input means: parent-child relationship data defining hierarchical relationships between parent and child items, operation instruction data providing one or more instruction instructing at least one operation on the parent-child relationship data, and retrieval data for defining a showing condition used for retrieving the parent-child relationship data;
storing the parent-child relationship data inputted by the input means in a data storage means;
updating the parent-child relationship data stored in the data storage means, in accordance with the operation instruction data inputted by the input means; and
retrieving select said parent-child relationship data stored in the data storage means, in accordance with the showing condition defined by the retrieval data inputted by the input means; wherein
the parent-child relationship data stored in the data storage means includes a data item concerned with an effective term defining a term for utilizing the data, and another data item concerned with a change term defining a changed term of the data where the data content is changed;
the retrieval data inputted by the input means has the showing condition instructing retrieval of two dates concerned with effective term, and one date concerned with changed term, and
the retrieving retrieves two set of parent-child relationship data, where the two sets of parent-child relationship data relate to the one data and includes a changed condition at the two dates with respect to each other, and outputs two opposing hierarchical graphical representations corresponding to the two sets of parent-child relationship data, respectively, where hierarchical elements common to both said two opposing hierarchical graphical representations are aligned with each other for intuitive visual comparison thereof.

6. The retrieving method of hierarchical structure data implemented by a computer according to claims 4 or 5, wherein the parent-child relationship data includes part number data and product structure data concerning an assembled product.

* * * * *